United States Patent [19]

Senda et al.

[11] Patent Number: 4,845,958
[45] Date of Patent: Jul. 11, 1989

[54] METHOD OF AND APPARATUS FOR PRESERVING PERISHABLE GOODS

[75] Inventors: Akira Senda; Takayuki Usui, both of Kanazawa, Japan

[73] Assignees: Mitsui & Co., Ltd., Tokyo; DML Company Limited, Kanazawa, both of Japan

[21] Appl. No.: 86,630
[22] PCT Filed: Dec. 26, 1986
[86] PCT No.: PCT/JP86/00658
§ 371 Date: Aug. 10, 1987
§ 102(e) Date: Aug. 10, 1987
[87] PCT Pub. No.: WO87/04053
PCT Pub. Date: Jul. 16, 1987

[30] Foreign Application Priority Data

Dec. 28, 1985 [JP] Japan ................. 60-298515
Feb. 14, 1986 [JP] Japan ................. 61-030557

[51] Int. Cl.[4] .............................................. F25D 17/04
[52] U.S. Cl. ........................................ 62/418; 62/78; 62/94; 62/440; 426/418; 426/419
[58] Field of Search .............. 62/48, 78, 89, 93, 94, 62/407, 418, 419, 440; 426/418, 419; 99/467

[56] References Cited

U.S. PATENT DOCUMENTS

| | | | |
|---|---|---|---|
| 2,281,625 | 5/1942 | Skinner | 426/419 |
| 3,792,595 | 2/1974 | Willis | 62/89 |
| 4,235,750 | 11/1980 | Cazalet | 426/419 X |
| 4,337,276 | 6/1982 | Nakamura et al. | 426/419 X |
| 4,467,612 | 8/1984 | Weasel, Jr. | 62/78 |
| 4,484,517 | 11/1984 | Amann | 426/418 X |
| 4,685,305 | 8/1987 | Burg | 62/78 |

FOREIGN PATENT DOCUMENTS

5946587 3/1982 Japan .

Primary Examiner—Ronald C. Capossela
Attorney, Agent, or Firm—Oblon, Spivak, McClelland, Maier & Neustadt

[57] ABSTRACT

The present invention relates to a preservation method and preservation apparatus which are suitable for preserving perishable goods for a long period of time. A method of the present invention is characterized by removing from the refrigerating chamber such harmful aging substances as ethylene or volatile base nitrogen triethylamine which are released from the perishable goods being preserved in a refrigerating chamber and which cause additional maturation and aging. In order to realize this method, an apparatus of the present invention is characterized by comprising adsorption materials which have adsorptivity to adsorb these harmful aging substances and are disposed in the refrigerating chamber for preserving the perishable goods. Since the above-described method and apparatus of the present invention can remove the harmful aging substances released from the perishable goods from the refrigerating chamber, it enables the safe prevention of the additional maturation and aging of the perishable goods which would be caused by the harmful aging substances. In addition, the apparatus of the invention is partitioned by a perforated plate into the cold-air blowout holes of a cooling unit and a preserving chamber for the perishable goods. The cold air passes through the fine pores of the perforated plate and is uniformly supplied to the perishable goods in the preserving chamber, whereby uniform cooling can be performed.

9 Claims, 2 Drawing Sheets

METHOD OF AND APPARATUS FOR PRESERVING PERISHABLE GOODS

DESCRIPTION

1. Technical Field

The present invention relates to a preservation method and preservation apparatus which are suitable for preserving perishable goods for a long period of time.

2. Background Art

It is desirable that perishable goods such as vegetables and fruits be stored in a low-temperature state. The reasons for this are as follows:

(1) Since metabolism is suppressed at a low temperature, there are only small changes in quality.

(2) Since the amount of respiration of perishable goods is reduced and the respiratory rates thereof are decreased, increases in the temperature of these goods can be suppressed.

(3) Since the maximum vapor pressure and relative humidity are decreased, losses in weight are reduced.

(4) Since the propagation and growth of pathogenic microorganisms are controlled, infection and spreading of blight are suppressed.

As described above, perishable goods are desirably preserved at low temperatures, but it is conventionally known that if their tissues become frozen, the quality deteriorates during thawing. In order to preserve perishable foods such as vegetables and fruits for a long period of time, it is therefore desirable that after they are harvested the temperature of the vegetables and fruits be decreased as soon as possible to a temperature at which there is no danger of freezing and that they be preserved at this temperature.

Japanese patent publication No. 46587/1984 discloses an apparatus for preserving such goods under temperature conditions as described above. The apparatus described in this publication, however, has a very complex structure and thus involves problems with respect to high fabrication and operation costs.

On the other hand, it is known that vegetables and fruits release harmful aging substances such as ethylene which cause additional maturation and aging of perishable goods. For example, when the perishable goods are flowers or buds, ethylene, ethylene dioxide, phenylethylene, methylethylene, or methylethyl carbinol is produced. When such a product spreads throughout a refrigerating chamber where perishable goods are being preserved, additional maturation and aging are caused and, for example, buds wither without opening. The production of the harmful aging substances such as ethylene and the degree of their functions depend upon temperature, and are suppressed at low temperatures. The low-temperature preservation of perishable goods, therefore, is also effective for suppressing the production and functions of these harmful aging substances.

However, there is a limit to the suppression of the additional maturation and aging of perishable goods caused by these harmful aging substances that can be attained by preserving them at a low temperature. In other words, even if the preservation conditions are such as to establish an ideal temperature and humidity, the additional maturation and aging caused by the harmful aging substances cannot be completely prevented and the perishable goods lose their freshness due to these harmful aging substances.

The inventors discovered first that such harmful aging substances are also present in perishable animal goods. Namely, it has become apparent that in the case of perishable animal goods, volatile base nitrogen triethylamine which is produced thereby is a harmful aging substance which causes them to lose their freshness.

All conventional methods for preserving perishable goods are, however, directed at controlling the temperature and humidity, and there has been no proposal with respect to the treatment of these harmful aging substances.

It is an object of the present invention to solve the above-mentioned problems.

DISCLOSURE OF INVENTION

In order to achieve the above described object, the method of the present invention is characterized by removing from a refrigerating chamber harmful aging substances such as ethylene or volatile base nitrogen triethylamine which are released from perishable goods being preserved in the refrigerating chamber and which cause additional maturation and aging.

In addition, in order to realize the above-described method, the apparatus of the present invention is characterized by disposing adsorption materials in a refrigerating chamber for preserving perishable goods, the adsorption materials having adsorptivity to adsorb at least such harmful aging substances as ethylene or volatile base nitrogen triethylamine which are released from the perishable goods and which cause additional maturation and aging.

Since the above-described method and apparatus of the present invention is capable of removing the harmful aging substances released from perishable goods, it is possible to safety prevent the additional maturation and aging of perishable goods that would be caused by the harmful aging substances.

When the perishable goods are horticultural goods such as vegetables, fruits or flowers, activated charcoal is preferable as the above-mentioned adsorption material, while in the case of perishable animal goods such as fishery products or livestock products, mixtures of activated charcoal snd zeolite are preferable as the above-described adsorption material. It is possible to select a mixing ratio within the range of 30 to 50 weight parts zeolite to 50 weight parts of activated charcoal. Among these ratios, a mixing ratio of 1:1 is particularly preferable.

Although activated charcoal is conventionally used as a disinfectant in a refrigerator, it the conventional amount used as a disinfectant it cannot remove the harmful aging substances such as ethylene or volatile base nitrogen triethylamine to a degree which prevents perishable goods from aging. In a preferable embodiment of the present invention, therefore, the inner surface of a refrigerating chamber is employed as the position at which the adsorption materials are disposed and is covered therewith, whereby a large adsorption area is secured and the adsorption efficiency is increased. Alternatively, a forced filter which has built-in adsorption materials may be disposed in a circulation passage of cold air within the refrigerating chamber. The amount of the adsorption materials is preferably within the range of 190 to 580 g relative to 1 $m^3$ of the volume of the refrigerating chamber. The grain size is preferably 50 mesh or more.

In addition, the adsorption materials comprising activated charcoal also have adsorptivity with respect to ethyl alcohol which is used for the sterilization of perishable goods. Therefore, sterilization using a high concentration of ethyl alcohol is made possible and it becomes possible to maintain freshness for a long period of time. In other words, when a high concentration of ethyl alcohol is used, the odor of the alcohol adheres to the perishable goods and makes them absolutely unfit for use as food. When the adsorption materials comprising activated charcoal having adsorptivity for ethyl alcohol are used in an amount sufficient to adsorb the harmful aging substances described above, the safe removal of the odor of ethyl alcohol by the adsorption materials enables the use of a high concentration of ethyl alcohol. Consequently, an extremely effective sterilization or an inhibitory action against proliferation is obtained. When the concentration of ethyl alcohol is 30% or more, particularly 50% or more, good sterilization is obtained. This sterilization means that various germs produced in the refrigerating chamber killed and that when perishable goods have been contaminated in the preceding processes of production and distribution, this contamination is removed. For example, when foods contaminated with various germs such as botrytis, phytophthora, or rhizopus, which are true soil fungi, through the growth soil, are placed in the refrigerating chamber, there is a larger that other foods will be infected with these germs, but the use of a high concentration of ethyl alcohol enables the sterilization of the foods and the prolongation of storage time.

Another apparatus for preserving perishable goods of the present invention is characterized by comprising a refrigerating chamber which is partitioned by a perforated plate into cold air blowout holes of a cooling unit which is disposed in the upper portion of the refrigerating chamber and a preserving chamber for perishable goods which is formed in the lower portion of the refrigerating chamber, the cold air blown out from the cold-air blowout holes passing through the fine pores of the perforated plate and then being supplied into the preserving chamber in a pressurized state which is increased to a value higher than the pressure in the preserving chamber.

In this apparatus configured as described above, after the pressure therein has been increased to a given value, the cold air blown out from the cold-air blowout holes passes through the fine pores of the perforated plate and is uniformly supplied into the preserving chamber at a given rate. It is therefore possible to uniformly cool each of the portions in the preserving chamber with the fresh cold air and to preserve the perishable goods preserved therein in an uniform low-temperature state.

In the above-mentioned apparatus, the flow of the cold air to be blown out from the cold-air blowout holes is preferably adjusted so that the rate of the cold air coming out of the fine pores of the perforated plate is within the range of 50 to 90 cm/sec. In addition, in order to adjust the humidity in the preserving chamber, it is preferable to dispose a humidifier for humidifying the cold air blown out from the cold-air blowout holes. On the other hand, in order to increase the efficiency of the cooling performed by the cold air, it is preferable to connect the suction side of the cooling unit to the bottom of the preserving chamber via a duct. An apparatus for sterilizing the perishable goods can be disposed in this duct.

A further apparatus of the present invention is characterized by comprising a refrigerating chamber which is partitioned by a perforated plate into air-blowout holes for a cooling unit which is disposed in the upper portion of the refrigerating chamber and a preserving chamber for perishable goods which is formed in the lower portion of the refrigerating chamber; and a filter having built-in adsorption materials which is disposed in the circulation passage for the cold air blown out from the cold-air blowout holes, the adsorption materials having adsorptivity to adsorb the harmful aging substances such as ethylene and volatile base nitrogen triethylamine which cause additional maturation and aging and the cold air blown out from the cold-air blowout holes passing through the fine pores of the perforated plate and being supplied into the reserving chamber in pressurized state which is increased to a value higher than that in the preserving chamber.

In this apparatus configured as described above, after the pressure therein has been increased to a given value, the cold air blown out from the cold-air blowout holes passes through the fine pores of the perforated plate and is uniformly supplied into the preserving chamber at a given rate. In addition, the harmful aging substances which are generated by the perishable goods and contained in the cold air are removed by the filter disposed in the circulation passage of the cold air. It is therefore possible to uniformly cool each of the portions of the preserving chamber with the fresh cold air and to store the perishable goods preserved therein in a uniform low-temperature state. It is also possible to safely prevent the additional maturation and aging which would be caused by the harmful aging substances.

When a material having adsorptivity for ethyl alcohol is used for the adsorption materials built into the filter, adhesion of the odor of ethyl alcohol on the perishable goods can be avoided even if the concentration of the aqueous solution of ethyl alcohol used as a germicidal material is as high as 30%.

BRIEF DESCRIPTION OF DRAWINGS

The present mention can be more fully understood with reference to the accompanying drawings in which.

BEST MODE FOR CARRYING OUT THE INVENTION

Figure 1:
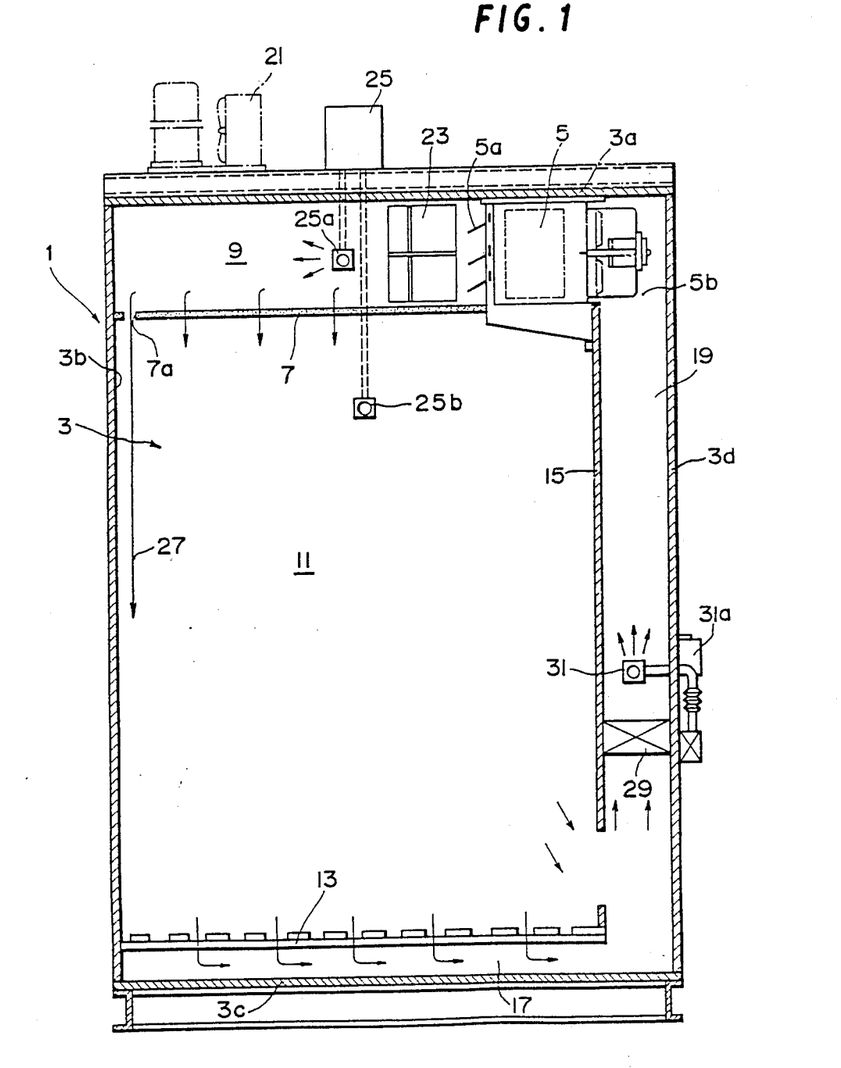
FIG. 1 is a sectional view which shows a refrigeration apparatus relating to an embodiment of the present invention.

A preferred embodiment of the present invention is described below with reference to the drawings. In FIG. 1, reference numeral 1 denotes a refrigerating chamber in which, in the inside 3 thereof, a cooling unit 5 is horizontally provided on the under surface of the upper wall 3a for blowing out cold air in a slightly downwardly inclined trajectory from each of the cold-air blowout holes 5a of the unit 5. A perforated plate 7 is horizontally disposed over the portion from the lower end of the cold-air blowout holes 5a to the inside 3b of the side wall of the refrigerating chamber so as to partition the inside 3 thereof into a pressure cooling chamber 9 on the side of the cold-air blowout holes 5a and a food preserving chamber 11 placed on the lower side. A drain board 13 is horizontally disposed in the bottom of the preserving chamber 11 at a given distance from the bottom wall 3c of the refrigerating chamber. Meanwhile, a vertical partition plate 15 is disposed on the other side wall 3d facing the side wall 3b of the refrigerating chamber so as to partition the refrigerating chamber to form a duct 19 which communicates the space 17 between the bottom of the preserving chamber 11 and the drain board 13 with the suction port side 5b of the cooling unit 5. By the above-described configuration, a circulation passage for the cold air from the cold-air blowout holes 5a leading to the suction port 5b is formed through the pressure cooling chamber 9, the preserving chamber 11, the space 11 and the duct 19. The cooling unit 5 is a known one in which a refrigeration cycle is provided between an outer apparatus 21 disposed on the upper surface of the upper wall 3a of the refrigerating chamber 1 and this unit 5. The respective portions are described in detail below.

Figure 2:
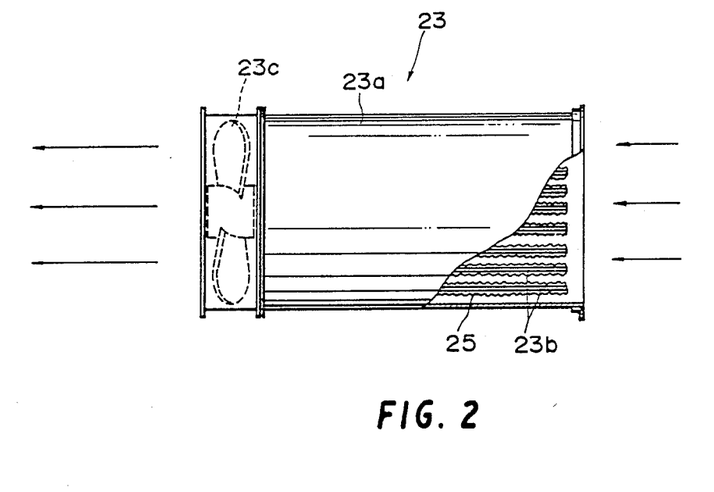
FIG. 2 is a partially-cut away view of a forced circulation filter comprising adsorption materials.

In the above-described pressure cooling chamber 9, a forced filter 23 having built-in adsorption materials is disposed in front of the cold-air blowout holes 5a. As shown in FIG. 2, this filter 23 comprises a plurality of plates 23b to which adsorption materials 25 are adhered and which are stacked in layers in an outer box 23a, and a suction fan 23 provided on one side of these plates 23b. The above plate having adsorption materials can be produced by, for example, blowing activated charcoal against a wire net. The amount of activated charcoal is adjusted to be about 190 to 580 g relative to 1 $m^3$ of the volume of the food preserving chamber 11. The grain size of activated charcoal is preferably 50 mesh or more. A blowout hole 25a of a humidifier 25 which is disposed outside of the refrigerating chamber is open on the cold air discharge side of the forced filter 23 which is comprised as described above. A suction port 25b of the humidifier is open on the upper side of the preserving chamber 11.

A plate having fine pores which allow the pressure in the pressure cooling chamber 9 to be increased to a value higher than the pressure in the preserving chamber 11 with the cold air from the cooling unit 5 is used as the perforated plate 17. In particular, it is preferable to use a plate having heat insulating ability, for example, Wood Rack (trade name; a first-class heat insulating material) having a thickness of about 5 to 9 mm. As shown in the drawings, a slit 7a is formed in the perforated plate 7a over the width of the refrigerating chamber on the side of the side wall 3b thereof and the cold air jetted into the preserving chamber 11 passes through this slit to form an air curtain, as shown by the arrow 27. This air curtain to some extent prevents hot air from entering from the side wall 3b.

On the other hand, an air filter 29 and an ethyl alcohol spray device 31 are arranged in this order in the duct 19 from the bottom thereof. The ethyl alcohol spray device 31 communicates with an alcohol tank 31a provided on the outside of the side wall 3d of the refrigerating chamber so that an aqueous solution of 30% or more ethyl alcohol is supplied to the spray device from the tank 31a and jetted into the duct in the form of a fog from the spray device.

INDUSTRIAL APPLICABILITY

The apparatus configured as described above is operated by driving the cooling unit 5, the outside apparatus 21, the ultrasonic humidifier 25 and the forced filter 23. The cold air blown out from the cooling unit 5 passes through the forced filter 23 and then through the perforated plate 7, moves downwardly in the preserving chamber 11, passes through the drain board 13 and the duct 19 and is lead to the suction side 5b of the cooling unit 5 to form a circulating flow. The harmful aging substances released from the perishable goods which are being preserved in the preserving chamber 11 are lead to the cooling unit 5 while being carried on this cold air circulating flow.

The forced filter 23 having the adsorption materials prevents the concentration of the harmful aging substances in the cold air from becoming greater than a given value. Since the forced filter 23 is disposed in the pressure cooling chamber 9 where the pressure becomes slightly higher than that in the preserving chamber 11 and forces the cold air to pass therethrough, the adsorption of the harmful aging substances can be uniformly performed over the whole body of cold air which moves downwardly in the preserving chamber 11 and partial aging produced by local existence of the harmful aging substances can also be prevented.

In addition, the cold air which has passed through the forced filter 23 is firstly pressurized in the pressure cooling chamber 9 and is thus not directly blown against the perishable goods in the preserving chamber. There is no occurrence of unevenness in the temperature of the perishable goods and, in particular, very little danger of the occurrence of low-temperature troubles with fruit which is easily affected by low temperatures. Since the pressure in the pressure cooling chamber 9 is increased to a value greater than that in the preserving chamber 11 by the cold air blown out from the cooling unit and humidified air is supplied into the pressure cooling chamber 9 from the humidified-air blowout port 25a, the humidified cold air passes at an increased pressure through the fine blowout pores of the perforated plate 7 and is jetted into and moves downwardly in the preserving chamber 11. Since the humidified air and cold air are sufficiently mixed in the pressure cooling chamber 9 and the blowout pores of the perforated plate 7 are uniformly distributed, the humidified cold air which moves downwardly in the preserving chamber 11 is very uniformly supplied thereto. In addition, since the humidified cold air moves downwardly at a given speed, the surroundings of the perishable goods are always brought into contact with fresh cold air and there is no occurrence of any change in temperature. In particular, since the harmful aging substances are removed by the adsorption performed by the forced filter 23, the concentration of the harmful aging substances in the preserving chamber 11 can be controlled to a given value or less, whereby aging of the perishable goods is prevented. Furthermore, since the perforated plate 7 is a first-class heat insulating plate, there is no fear of dewing and damage of the soft perishable goods due to dripping of dew water.

It is desirable to make the speed of the cold air which moves downwardly in the preserving plate 11 through the perforated plate 7 adjustable to meet the needs of different kinds of the perishable goods stored. This can be realized by making the amount of air blown out from the cooling unit 5 adjustable by means of an inverter. When the descending speed used in experiments was 50 to 90 cm/sec, good preservation results were obtained.

The temperature of the cold air, i.e. the temperature in the preserving chamber 11, can be adjusted by changing the set temperature of the cooling unit 5. In other words, the temperature can be adjusted to, for example, a minimum temperature within the range of $-0.5°$ to $-2.5°$ C. at which the perishable goods do not freeze, depending upon the kinds of perishable goods being stored.

The ethyl alcohol spray device 31 supplied ethyl alcohol at a concentration of 30% or more in a fog form to the suction port side 5b of the cooling unit 5. Since this ethyl alcohol is supplied into the preserving chamber 11 together with the cold air, if harmful germs adhere to the perishable goods being preserved or are produced therein, it is possible to kill the germs immediately. In addition, since the odor of alcohol is adsorbed by the plates 23b having the adsorption materials in the forced filter 23, there is no adhesion of the odor to the perishable goods preserved. The concentration of ethyl alcohol is 1 to 3% in terms of the concentration in the preserving chamber 11.

The adsorption materials 25 may be built in the forced filter 23 or applied to the inner surface of the preserving chamber 11. When the adsorption materials which are in the form of adsorption edge wall plates are mounted on the inner surface of the preserving chamber 11, it is preferable to mount as many of them as possible on the inner surfaces in order to secure maximum surface area of the adsorption materials.

The excellent performance of the method and the apparatus of the present invention is described below by way of the results of certain experiments. Tables 1 to 13 show the results obtained from the examination of changes that took place when the perishable goods shown on the left above the respective tables were preserved in the refrigerating apparatus having the above-described configuration of the present invention, an ice refrigerator, and a refrigerator available on the market. It can be seen from the results of the experiments that the apparatus for preserving goods while adsorbing harmful aging harmful exhibits excellent properties.

TABLE 1

Name: Strawberry

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C.~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ● | ● | | | ● | ● | | | ● | ● | | |
| 2 | ● | ● | | | ● | ● | | | ○ | ○ | | |
| 3 | ● | ● | | | ● | ● | | | Δ | Δ | | |
| 4 | ● | ● | | | ● | ● | | | X | X | Δ | * |
| 5 | ● | ● | | | ● | ● | | | | | | |
| 6 | ● | ● | | | ● | ● | | | | | | |
| 7 | ● | ● | | | ● | ● | | | | | | |
| 8 | ● | ● | | | ● | ● | | | | | | |
| 9 | ● | ● | | | ● | ● | | | | | | |
| 10 | ● | ● | | | ● | ● | | | | | | |
| 15 | ● | ● | | | ○ | ○ | X | | | | | |
| 20 | ● | ● | | | Δ | Δ | | * | | | | |
| 25 | ● | ● | | | X | X | | | | | | |
| 30 | ● | ● | | | | | | | | | | |
| 40 | ● | ● | | | | | | | | | | |
| 50 | ○ | ○ | | * | | | | | | | | |
| 60 | Δ | ○ | X | | | | | | | | | |
| 70 | X | X | | | | | | | | | | |
| 80 | | | | | | | | | | | | |
| 90 | | | | | | | | | | | | |

●: Very good,
○: Good,
Δ: Slight aging,
*: Generation of mold,
X: Browning, Degoneration of taste, Decay

TABLE 2

Name: Mushroom

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C.~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ● | ● | | | ● | ● | | | ● | ● | | |
| 2 | ● | ● | | | ● | ● | | | ● | ● | | |
| 3 | ● | ● | | | ● | ● | | | ● | ● | | |
| 4 | ● | ● | | | ● | ● | | | ○ | ○ | | |
| 5 | ● | ● | | | ● | ● | | | ○ | ○ | | |
| 6 | ● | ● | | | ● | ● | | | Δ | Δ | X | |
| 7 | ● | ● | | | ● | ● | | | Δ | Δ | | * |
| 8 | ● | ● | | | ● | ● | | | X | X | | |
| 9 | ● | ● | | | ○ | ○ | | | | | | |
| 10 | ● | ● | | | Δ | Δ | X | * | | | | |
| 15 | ● | ○ | | | X | X | | | | | | |
| 20 | ● | ○ | | | | | | | | | | |
| 25 | ● | ○ | | | | | | | | | | |
| 30 | ○ | ○ | | | | | | | | | | |
| 40 | ○ | Δ | Δ | | | | | | | | | |
| 50 | Δ | X | Δ | * | | | | | | | | |

TABLE 2-continued

Name: Mushroom

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 60 | X | | X | | | | | | | | | |
| 70 | | | | | | | | | | | | |
| 80 | | | | | | | | | | | | |
| 90 | | | | | | | | | | | | |

●: Very good,
○: Good,
Δ: Slight aging,
*: Generation of mold,
X: Browning, Degoneration of taste, Decay

TABLE 3

Name: Broccoli

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1  | ● | ● | | | ● | ● | | | ● | ● | | |
| 2  | ● | ● | | | ● | ● | | | ● | ● | | |
| 3  | ● | ● | | | ● | ● | | | ● | ● | | |
| 4  | ● | ● | | | ● | ● | | | ● | ● | | |
| 5  | ● | ● | | | ● | ● | | | ○ | ● | | |
| 6  | ● | ● | | | ● | ● | | | ○ | ○ | | |
| 7  | ● | ● | | | ● | ● | | | Δ | Δ | | |
| 8  | ● | ● | | | ● | ● | | | Δ | Δ | | * |
| 9  | ● | ● | | | ● | ● | | | X | X | X | |
| 10 | ● | ● | | | ● | ● | | | | | | |
| 15 | ● | ● | | | ● | ● | | | | | | |
| 20 | ● | ● | | | ○ | ○ | | | | | | |
| 25 | ● | ● | | | Δ | Δ | | * | | | | |
| 30 | ● | ○ | | | X | X | X | | | | | |
| 40 | ● | ○ | | | | | | | | | | |
| 50 | ● | ○ | | | | | | | | | | |
| 60 | ○ | ○ | | | | | | | | | | |
| 70 | ○ | ○ | | | | | | | | | | |
| 80 | ○ | Δ | | | | | | | | | | |
| 90 | Δ | Δ | Δ | * | | | | | | | | |

●: Very good,
○: Good,
Δ: Slight aging,
*: Generation of mold,
X: Browning, Degoneration of taste, Decay

TABLE 4

Name: Horse mackeral

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1  | ● | ● | | | ● | ● | | | ● | ● | | |
| 2  | ● | ● | | | ● | ● | | | ● | ○ | | |
| 3  | ● | ● | | | ● | ● | | | ● | ○ | | |
| 4  | ● | ● | | | ● | ● | | | ● | ○ | | |
| 5  | ● | ● | | | ● | ● | | | ○ | Δ | | |
| 6  | ● | ● | | | ● | ● | | | ○ | Δ | | |
| 7  | ● | ● | | | ● | ● | | | ○ | X | | |
| 8  | ● | ● | | | ● | ● | | | Δ | | | |
| 9  | ● | ● | | | ○ | ○ | | | Δ | | | * |
| 10 | ● | ● | | | ○ | ○ | | | Δ | | | |
| 15 | ● | ● | | | Δ | Δ | Δ | * | X | | X | |
| 20 | ○ | ● | | | X | X | X | | | | | |
| 25 | Δ | ○ | | | | | | | | | | |
| 30 | Δ | Δ | X | * | | | | | | | | |
| 40 | X | X | | | | | | | | | | |

TABLE 4-continued

Name: Horse mackeral

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 50 | | | | | | | | | | | | |
| 60 | | | | | | | | | | | | |
| 70 | | | | | | | | | | | | |
| 80 | | | | | | | | | | | | |
| 90 | | | | | | | | | | | | |

◉: Very good,
○: Good,
Δ: Slight aging,
*: Generation of mold,
X: Browning, Degoneration of taste, Decay

TABLE 5

Name: Skipjack

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | ◉ | ◉ | | |
| 3 | ◉ | ◉ | | | ◉ | ◉ | | | Δ | ○ | | |
| 4 | ◉ | ◉ | | | ◉ | ◉ | | | X | ○ | | |
| 5 | ◉ | ◉ | | | ◉ | ◉ | | | | Δ | | * |
| 6 | ◉ | ◉ | | | ◉ | ◉ | | | | X | | |
| 7 | ◉ | ◉ | | | ◉ | ◉ | | | | | | |
| 8 | ◉ | ◉ | | | ◉ | ◉ | | | | | | |
| 9 | ◉ | ◉ | | | ○ | ○ | | | | | | |
| 10 | ◉ | ◉ | | | ○ | Δ | | | | | | |
| 15 | ◉ | ◉ | | | Δ | Δ | | * | | | | |
| 20 | ○ | ○ | | | X | X | X | | | | | |
| 25 | ○ | ○ | | | | | | | | | | |
| 30 | Δ | Δ | | * | | | | | | | | |
| 40 | X | X | X | | | | | | | | | |
| 50 | | | | | | | | | | | | |
| 60 | | | | | | | | | | | | |
| 70 | | | | | | | | | | | | |
| 80 | | | | | | | | | | | | |
| 90 | | | | | | | | | | | | |

◉: Very good,
○: Good,
Δ: Slight aging,
*: Generation of mold,
X: Browning, Degoneration of taste, Decay

TABLE 6

Name: Mackerel

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | ◉ | ◉ | | |
| 3 | ◉ | ◉ | | | ◉ | ◉ | | | ◉ | ◉ | | |
| 4 | ◉ | ◉ | | | ◉ | ◉ | | | ○ | ○ | | |
| 5 | ◉ | ◉ | | | ◉ | ◉ | | | ○ | ○ | | |
| 6 | ◉ | ◉ | | | ◉ | ◉ | | | ○ | ○ | | |
| 7 | ◉ | ◉ | | | ◉ | ◉ | | | ○ | Δ | | |
| 8 | ◉ | ◉ | | | ○ | ○ | | | | | X | |
| 9 | ◉ | ◉ | | | ○ | ○ | | | | | | * |
| 10 | ◉ | ◉ | | | Δ | Δ | | | X | | | |
| 15 | ○ | ◉ | | | X | X | X | * | | | | |
| 20 | ○ | ○ | | | | | | | | | | |
| 25 | | | | | | | | | | | | |
| 30 | X | X | X | * | | | | | | | | |

TABLE 6-continued

Name: Mackerel

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 40 | | | | | | | | | | | | |
| 50 | | | | | | | | | | | | |
| 60 | | | | | | | | | | | | |
| 70 | | | | | | | | | | | | |
| 80 | | | | | | | | | | | | |
| 90 | | | | | | | | | | | | |

◉: Very good,
○: Good,
Δ: Slight aging,
*: Generation of mold,
X: Browning, Degeneration of taste, Decay

TABLE 7

Name: Thawed tunas

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | ◉ | ◉ | | |
| 3 | ◉ | ◉ | | | ◉ | ◉ | | | Δ | ○ | | |
| 4 | ◉ | ◉ | | | ◉ | ◉ | | | X | ○ | | |
| 5 | ◉ | ◉ | | | ◉ | ◉ | | | | ○ | | |
| 6 | ◉ | ◉ | | | ◉ | ◉ | | | | Δ | | |
| 7 | ◉ | ◉ | | | ◉ | ◉ | | | | X | | |
| 8 | ◉ | ◉ | | | ◉ | ◉ | | | | | | |
| 9 | ◉ | ◉ | | | ◉ | ◉ | | | | | | |
| 10 | ◉ | ◉ | | | ◉ | ○ | | | | | Δ | * |
| 15 | ◉ | ◉ | | | ○ | Δ | | | | | X | |
| 20 | ◉ | ○ | | | Δ | X | X | * | | | | |
| 25 | ○ | ○ | | | X | | | | | | | |
| 30 | ○ | Δ | | | | | | | | | | |
| 40 | Δ | X | X | * | | | | | | | | |
| 50 | X | | | | | | | | | | | |
| 60 | | | | | | | | | | | | |
| 70 | | | | | | | | | | | | |
| 80 | | | | | | | | | | | | |
| 90 | | | | | | | | | | | | |

◉: Very good,
○: Good,
Δ: Slight aging,
*: Generation of mold,
X: Browning, Degeneration of taste, Decay

TABLE 8

Name: Raw tiger prawn

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | ○ | ◉ | | |
| 3 | ◉ | ◉ | | | ◉ | ◉ | | | ○ | ○ | | |
| 4 | ◉ | ◉ | | | ◉ | ◉ | | | | ○ | | |
| 5 | ◉ | ◉ | | | ◉ | ◉ | | | X | ○ | | |
| 6 | ◉ | ◉ | | | ◉ | ◉ | | | | | | |
| 7 | ◉ | ◉ | | | ◉ | ◉ | | | | X | | |
| 8 | ◉ | ◉ | | | ◉ | ◉ | | | | | | |
| 9 | ◉ | ◉ | | | ◉ | ◉ | | | | | | * |
| 10 | ◉ | ◉ | | | ○ | ○ | | | | | | |
| 15 | ◉ | ◉ | | | Δ | Δ | Δ | * | | Δ | X | |
| 20 | Δ | ○ | | | X | X | X | | | | | |
| 25 | X | Δ | | | | | | | | | | |

TABLE 8-continued

Name: Raw tiger prawn

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 30 | X | X | | * | | | | | | | | |
| 40 | | | | | | | | | | | | |
| 50 | | | | | | | | | | | | |
| 60 | | | | | | | | | | | | |
| 70 | | | | | | | | | | | | |
| 80 | | | | | | | | | | | | |
| 90 | | | | | | | | | | | | |

◉: Very good,
○: Good,
Δ: Slight aging,
*: Generation of mold,
X: Browning, Degoneration of taste, Decay

TABLE 9

Name: Sea urchin

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | ○ | ○ | | |
| 3 | ◉ | ◉ | | | ◉ | ◉ | | | Δ | Δ | | |
| 4 | ◉ | ◉ | | | ◉ | ◉ | | | X | X | | |
| 5 | ◉ | ◉ | | | ◉ | ◉ | | | | | | |
| 6 | ◉ | ◉ | | | ◉ | ◉ | | | | | | |
| 7 | ◉ | ◉ | | | ◉ | ○ | | | | | | |
| 8 | ◉ | ◉ | | | ○ | ○ | | | | | | * |
| 9 | ◉ | ◉ | | | ○ | ○ | | | | | | |
| 10 | ◉ | ◉ | | | ○ | ○ | | | | | Δ | |
| 15 | ◉ | ◉ | | | ○ | ○ | | | | | X | |
| 20 | ◉ | ◉ | | | Δ | Δ | Δ | * | | | | |
| 25 | ◉ | ◉ | | | X | X | X | | | | | |
| 30 | ○ | ○ | | | | | | | | | | |
| 40 | ○ | Δ | | | | | | | | | | |
| 50 | Δ | Δ | | | | | | | | | | |
| 60 | X | X | | * | | | | | | | | |
| 70 | | | | | | | | | | | | |
| 80 | | | | | | | | | | | | |
| 90 | | | | | | | | | | | | |

◉: Very good,
○: Good,
Δ: Slight aging,
*: Generation of mold,
X: Browning, Degoneration of taste, Decay

TABLE 10

Name: Beef

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | ◉ | ◉ | | |
| 3 | ◉ | ◉ | | | ◉ | ◉ | | | ○ | ◉ | | |
| 4 | ◉ | ◉ | | | ◉ | ◉ | | | ○ | ○ | | |
| 5 | ◉ | ◉ | | | ◉ | ◉ | | | ○ | ○ | | |
| 6 | ◉ | ◉ | | | ◉ | ◉ | | | Δ | Δ | Δ | |
| 7 | ◉ | ◉ | | | ◉ | ◉ | | | X | X | X | * |
| 8 | ◉ | ◉ | | | ◉ | ○ | | | | | | |
| 9 | ◉ | ◉ | | | ◉ | ○ | | | | | | |
| 10 | ◉ | ◉ | | | ○ | ○ | | | | | | |
| 15 | ◉ | ◉ | | | ○ | Δ | | | | | | |
| 20 | ◉ | ◉ | | | ○ | Δ | Δ | | | | | |

TABLE 10-continued

Name: Beef

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 25 | ● | ● | | | Δ | X | Δ | * | | | | |
| 30 | ● | ○ | | | X | | X | | | | | |
| 40 | ○ | ○ | | | | | | | | | | |
| 50 | Δ | Δ | | * | | | | | | | | |
| 60 | X | X | X | | | | | | | | | |
| 70 | | | | | | | | | | | | |
| 80 | | | | | | | | | | | | |
| 90 | | | | | | | | | | | | |

●: Very good,
○: Good,
Δ: Slight aging,
*: Generation of mold,
X: Browning, Degoneration of taste, Decay

TABLE 11

Name: Carnation

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ● | ● | | | ● | ● | | | ● | | | |
| 2 | ● | ● | | | ● | ● | | | ○ | Δ | | |
| 3 | ● | ● | | | ● | ● | | | X | X | | |
| 4 | ● | ● | | | ● | ● | | | | | | |
| 5 | ● | ● | | | ● | ● | | | | | | |
| 6 | ● | ● | | | ● | ● | | | | | | |
| 7 | ● | ● | | | ● | ● | | | | | | |
| 8 | ● | ● | | | ● | ● | | | | | | |
| 9 | ● | ● | | | ● | ● | | | | | | |
| 10 | ● | ● | | | ● | ○ | | | | | | |
| 15 | ● | ● | | | ○ | ○ | | | | | | |
| 20 | ● | ● | | | ○ | ○ | | | | | | |
| 25 | ● | ● | | | ○ | Δ | | | | | | |
| 30 | ● | ● | | | X | X | | * | | | | |
| 40 | ● | ● | | | | | | | | | | |
| 50 | ● | ● | | | | | | | | | | |
| 60 | ○ | | | * | | | | | | | | |
| 70 | Δ | Δ | | | | | | | | | | |
| 80 | X | X | | | | | | | | | | |
| 90 | | | | | | | | | | | | |

●: Very good,
○: Good,
Δ: Slight aging,
*: Generation of mold,
X: Browning, Degoneration of taste, Decay

TABLE 12

Name: Rose

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ● | ● | | | ● | ● | | | ● | ○ | | |
| 2 | ● | ● | | | ● | ● | | | ○ | Δ | | |
| 3 | ● | ● | | | ● | ● | | | X | X | | |
| 4 | ● | ● | | | ● | ● | | | | | | |
| 5 | ● | ● | | | ● | ● | | | | | | |
| 6 | ● | ● | | | ● | ● | | | | | | |
| 7 | ● | ● | | | ● | ● | | | | | | |
| 8 | ● | ● | | | ● | ● | | | | | | |
| 9 | ● | ● | | | ● | ● | | | | | | |
| 10 | ● | ● | | | ● | ○ | | | | | | |
| 15 | ● | ● | | | ○ | ○ | | | | | | |

TABLE 12-continued

Name: Rose

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 20 | ◉ | ◉ | | | ○ | △ | | | | | | |
| 25 | ◉ | ◉ | | | △ | △ | | * | | | | |
| 30 | ◉ | ◉ | | | X | X | | | | | | |
| 40 | ◉ | ◉ | | | | | | | | | | |
| 50 | ◉ | ◉ | | | | | | | | | | |
| 60 | ○ | ○ | | * | | | | | | | | |
| 70 | △ | △ | | | | | | | | | | |
| 80 | X | | | | | | | | | | | |
| 90 | | | | | | | | | | | | |

◉ : Very good,
○ : Good,
△: Slight aging,
*: Generation of mold,
X: Browning, Degoneration of taste, Decay

TABLE 13

Name: *Tradescantia reflexa*

| | Refrigerating apparatus of this invention using adsorption materials 0° C. ± 0.5° C. RH 80-90% | | | | Ice refrigerator (conventional) 0° C. ± 1° C. RH 80-90% | | | | Refrigerating apparatus (conventional) 2° C. ~ −8° C. | | | |
|---|---|---|---|---|---|---|---|---|---|---|---|---|
| Day | Color | Feeling | Decay | Mold | Color | Feeling | Decay | Mold | Color | Feeling | Decay | Mold |
| 1 | ◉ | ◉ | | | ◉ | ◉ | | | ◉ | ◉ | | |
| 2 | ◉ | ◉ | | | ◉ | ◉ | | | X | X | | |
| 3 | ◉ | ◉ | | | ◉ | ◉ | | | | | | |
| 4 | ◉ | ◉ | | | ◉ | ◉ | | | | | | |
| 5 | ◉ | ◉ | | | ◉ | ◉ | | | | | | |
| 6 | ◉ | ◉ | | | ◉ | ◉ | | | | | | |
| 7 | ◉ | ◉ | | | ○ | ○ | | | | | | |
| 8 | ◉ | ○ | | | ○ | ○ | | | | | | |
| 9 | ◉ | ○ | | | △ | △ | | | | | | |
| 10 | ○ | ○ | | | △ | △ | | * | | | | |
| 15 | ○ | △ | | | X | X | | | | | | |
| 20 | △ | △ | | * | | | | | | | | |
| 25 | △ | △ | | | | | | | | | | |
| 30 | △ | X | | | | | | | | | | |
| 40 | X | | | | | | | | | | | |
| 50 | | | | | | | | | | | | |
| 60 | | | | | | | | | | | | |
| 70 | | | | | | | | | | | | |
| 80 | | | | | | | | | | | | |
| 90 | | | | | | | | | | | | |

◉ : Very good,
○ : Good,
△: Slight aging,
*: Generation of mold,
X: Browning, Degoneration of taste, Decay

What is claimed is:

1. An apparatus for preserving perishable goods, comprising:

a refrigerating chamber for storing perishable goods provided with a door on one side;

a perforated plate separating the inside of said refrigerating chamber into upper and lower chambers;

a cold-air blow out hole of a cooling unit having a suction port which is disposed in said upper chamber and through which cold air blows therethrough;

a goods preserving compartment formed in said lower chamber separated by said perforated plate;

a duct means communicating said suction port side of said cooling unit with the lower portion of said preserving compartment;

a sterilizing means disposed in said duct means;

a humidifier positioned to humidify the cold air blowing from said cooling unit;

a slit formed between said door and said perforated plate and extending along the inner side of said door, whereby the cold-air blowing from said blow out hole of the cooling unit passes through small openings in said perforated plate and enters into said preserving compartment under a higher pressure than the pressure in said preserving compartment, and at the same time a portion of the cold air passing through said slit into said preserving compartment forms an air curtain inside said door.

2. The apparatus as set forth in claim 1, wherein the flow rate of said cold air flowing from said blow out hole is adjustable.

3. The apparatus as set forth in claim 2, wherein the flow rate of said cold air after passing through the openings in the perforated plate is in the range of 50 to 90 cm/sec.

4. The apparatus as set forth in claim 1, further comprising a filter having an adsorptive material therein which is positioned in the circulation passage of said cold air blowing from said blow out hole, said adsorptive material being able to adsorb the volatile nitrogen base triethylamine released from said perishable goods.

5. The apparatus as set forth in claim 4, wherein the flow rate of said cold air blowing from said blow out hole is adjustable.

6. The apparatus as set forth in claim 5, wherein the flow rate of said cold air after passing through the opening in the perforated plate is in the range of 50 to 90 cm/sec.

7. The apparatus as set forth in claim 4, wherein said adsorptive material has the ability to adsorb ethyl alchol.

8. The apparatus as set forth in claim 7, wherein said sterilizer is a device which supplys an ethyl alcohol solution of a concentration of at least 30%.

9. The apparatus as set forth in claim 8, wherein said adsorptive material is provided in the range of 190 to 580 g per 1 $m^3$ of said refrigerating compartment and is particulate material having a grain size of at least 50 mesh.

* * * * *